(12) United States Patent
Li et al.

(10) Patent No.: US 10,347,272 B2
(45) Date of Patent: Jul. 9, 2019

(54) DE-REVERBERATION CONTROL METHOD AND APPARATUS FOR DEVICE EQUIPPED WITH MICROPHONE

(71) Applicant: Beijing Xiaoniao Tingting Technology Co., LTD., Beijing (CN)

(72) Inventors: Bo Li, Beijing (CN); Shasha Lou, Beijing (CN)

(73) Assignee: Beijing Xiaoniao Tingting Technology Co., LTD., Beijing (CN)

( * ) Notice: Subject to any disclaimer, the term of this patent is extended or adjusted under 35 U.S.C. 154(b) by 0 days.

(21) Appl. No.: 15/849,010

(22) Filed: Dec. 20, 2017

(65) Prior Publication Data

US 2018/0190310 A1 Jul. 5, 2018

(30) Foreign Application Priority Data

Dec. 29, 2016 (CN) .......................... 2016 1 1242986

(51) Int. Cl.
| | |
|---|---|
| *G10L 21/0216* | (2013.01) |
| *G01H 7/00* | (2006.01) |
| *H04M 9/08* | (2006.01) |
| *H04R 3/02* | (2006.01) |
| *G10L 21/0208* | (2013.01) |
| *H04R 27/00* | (2006.01) |
| *H04S 7/00* | (2006.01) |

(52) U.S. Cl.
CPC .......... *G10L 21/0216* (2013.01); *G01H 7/00* (2013.01); *G10L 21/0208* (2013.01); *H04M 9/08* (2013.01);
(Continued)

(58) Field of Classification Search
CPC ...... G10L 21/0216; G10L 2021/02082; H04M 9/082; H04B 3/23; H04B 3/231;
(Continued)

(56) References Cited

U.S. PATENT DOCUMENTS

| | | | |
|---|---|---|---|
| 2011/0255702 A1 | 10/2011 | Jensen | |
| 2013/0028432 A1 | 1/2013 | Suzuki et al. | |

(Continued)

FOREIGN PATENT DOCUMENTS

| | | |
|---|---|---|
| CN | 102238457 A | 11/2011 |
| EP | 2552131 A2 | 1/2013 |
| WO | 2016049403 A1 | 3/2016 |

OTHER PUBLICATIONS

Supplementary European Search Report in European application No. 17209223.1, dated Sep. 5, 2018.
(Continued)

*Primary Examiner* — Disler Paul

(74) *Attorney, Agent, or Firm* — Mintz Levin Cohn Ferris Glovsky and Popeo, P.C.; Kongsik Kim; Jhongwoo Jay Peck

(57) ABSTRACT

Provided are a de-reverberation control method and apparatus for a device equipped with a microphone. The method includes: reverberation parameters which indicate, at respective moments, reverberation levels of a room environment where the device is located are acquired from an audio signal played by the device; and a de-reverberation mode adopted by the device is dynamically adjusted according to the reverberation levels indicated by the reverberation parameters at different moments and preset correspondences between reverberation levels and de-reverberation modes. By adopting a dynamic de-reverberation mode, the method and the apparatus disclosed herein significantly improve the rate of the recognition of a device for the voice of the user.

18 Claims, 2 Drawing Sheets

```
┌─────────────────────────────────────────────┐
│ Acquiring, from an audio signal played by   │
│ the device, reverberation parameters which  │  S101
│ indicate, at respective moments,            │
│ reverberation levels of a room environment  │
│ in which the device is located              │
└─────────────────────────────────────────────┘
                      │
                      ▼
┌─────────────────────────────────────────────┐
│ Dynamically adjusting a de-reverberation    │
│ mode adopted by the device according to the │
│ reverberation levels indicated by the       │  S102
│ reverberation parameters at respective      │
│ moments and preset correspondences between  │
│ reverberation levels and de-reverberation   │
│ modes                                       │
└─────────────────────────────────────────────┘
```

(52) U.S. Cl.
CPC ...... *H04R 3/02* (2013.01); *G10L 2021/02082* (2013.01); *G10L 2021/02166* (2013.01); *H04R 27/00* (2013.01); *H04R 2227/007* (2013.01); *H04S 7/305* (2013.01)

(58) Field of Classification Search
CPC ...... H04B 3/20; H04R 3/02; H04R 2227/007; H04S 7/305
USPC .......................................... 381/66, 83, 95–96
See application file for complete search history.

(56) References Cited

U.S. PATENT DOCUMENTS

| | | | |
|---|---|---|---|
| 2014/0198923 A1* | 7/2014 | Miet | G10K 11/178 381/66 |
| 2015/0364136 A1* | 12/2015 | Katuri | H04R 3/02 704/233 |
| 2016/0021458 A1* | 1/2016 | Johnson | H04R 29/002 381/303 |
| 2016/0021481 A1* | 1/2016 | Johnson | H04R 3/12 381/303 |
| 2017/0303053 A1 | 10/2017 | Falch et al. | |
| 2018/0176679 A1* | 6/2018 | Lu | H04R 1/406 |

OTHER PUBLICATIONS

The Partial Supplementary european Search Report in European Application No. 17209223.1, dated May 4, 2018.

First Office Action issued in Chinese Patent Application No. 201611242986.9 dated Mar. 4, 2019.

* cited by examiner

DE-REVERBERATION CONTROL METHOD AND APPARATUS FOR DEVICE EQUIPPED WITH MICROPHONE

CROSS-REFERENCE TO RELATED APPLICATION

The application claims priority to Chinese Application No. 201611242986.9 filed on Dec. 29, 2016, which is incorporated herein by reference.

TECHNICAL FIELD

The disclosure relates to the technical field of intelligent terminals, and in particular to a de-reverberation control method and apparatus for a device equipped with a microphone

BACKGROUND

In a long-distance voice interaction, a signal received by a microphone is likely to be affected by environmental reverberation. For example, in a room, voice is reflected for many times by the surfaces of walls, floors and furniture, therefore, the signal received by a microphone is the mixed signal of direct sound and reflected sound. This part of reflected sound is a reverberation signal. Reverberation occurs easily when the speaker is relatively far away from a microphone and the communication environment is a relatively closed space. A severe reverberation will make speech unclear, thereby lowering the quality of a communication. Moreover, the interference caused by a reverberation will degrade the performance of an acoustic receiving system and noticeably lower the performance of a voice recognition system. Thus, the employment of a de-reverberation technology is necessary.

In most of existing de-reverberation schemes, a de-reverberation mode to be used is usually determined when a voice communication starts, and the de-reverberation mode continues to be used during the communication to eliminate reverberation. However, the environment of the communication or the position of the user changes ceaselessly, therefore, existing de-reverberation schemes cause, in some scenes, much residual reverberation and a poor de-reverberation effect, and cause, in other scenes, a damage to the voice of the user and a low user instruction recognition rate.

SUMMARY

A de-reverberation control method and apparatus for a device equipped with a microphone are disclosed herein to address the problem of low voice instruction recognition rate existing in existing schemes.

To achieve the purposes above, the technical schemes of the disclosure are as follows.

In one aspect, a de-reverberation control method for a device equipped with a microphone is provided herein. The method includes:

reverberation parameters which indicate, at respective moments, reverberation levels of a room environment where a device is located are acquired from an audio signal played by the device; and a de-reverberation mode adopted by the device is dynamically adjusted according to the reverberation levels indicated by the reverberation parameters at respective moments and preset correspondences between reverberation levels and de-reverberation modes.

In another aspect, a de-reverberation control apparatus for a device equipped with a microphone is provided herein. The apparatus includes:

a reverberation parameter acquisition unit arranged to acquire, from an audio signal played by the device, reverberation parameters which indicate, at respective moments, reverberation levels of a room environment where the device is located; and a dynamic adjustment unit arranged to dynamically adjust a de-reverberation mode adopted by the device according to the reverberation levels indicated by the reverberation parameters at respective moments and preset correspondences between reverberation levels and de-reverberation modes.

According to the technical schemes provided herein, by continuously detecting and calculating reverberation parameters at different moments, the change occurring in the level of reverberation during a voice interaction process can be acquired in real time, and a de-reverberation mode can be dynamically adjusted according to the change in the level of reverberation, thus it is possible to guarantee the adoption of a proper de-reverberation mode suitable for the current situation at any moment, avoid the occurrence of much residual reverberation in some cases and a damage to the voice of the user in other cases, and consequentially improve the rate of the recognition of a device for the voice of the user.

DETAILED DESCRIPTION

The objective, the technical schemes and the advantages of the disclosure will be more readily apparent from the following detailed description of embodiments when read in conjunction with the accompanying drawings.

Figure 1:
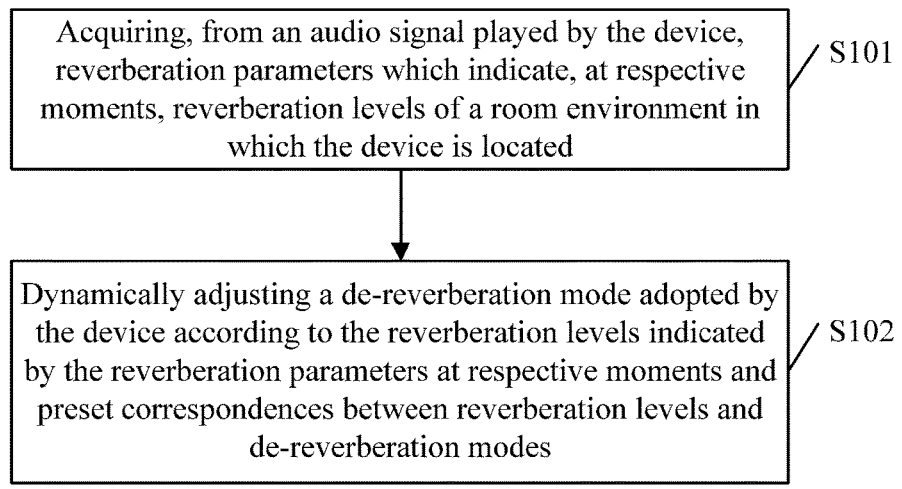
FIG. 1 is a flow chart schematically illustrating a de-reverberation control method for a device equipped with a microphone provided herein.
Figure 2:
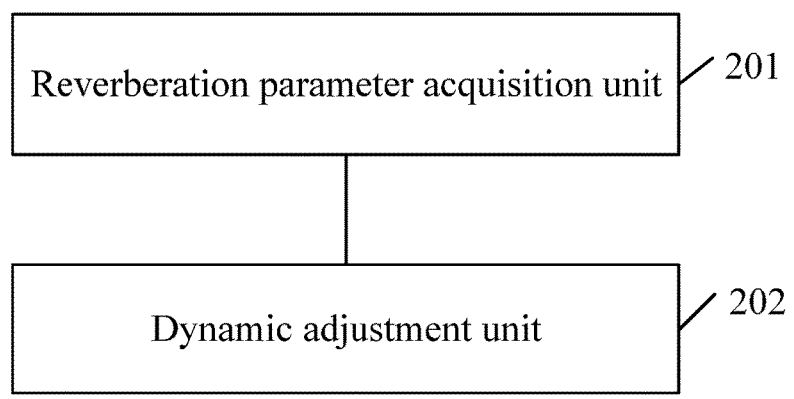
FIG. 2 is a schematic diagram illustrating a de-reverberation control apparatus for a device equipped with a microphone provided herein.

A de-reverberation control method for a device equipped with a microphone is provided in an embodiment of the disclosure. Refer to FIG. 1, the method includes:

In step S101, reverberation parameters which indicate, at respective moments, reverberation levels of a room environment where a device is located are acquired from an audio signal played by the device; and In step S102, a de-reverberation mode adopted by the device is dynamically adjusted according to the reverberation levels indicated by the reverberation parameters at respective moments and preset correspondences between reverberation levels and de-reverberation modes.

In another embodiment of the disclosure based on the embodiment shown in FIG. 1, reverberation time is further selected as another type of the reverberation parameter in S101, in this case, the method includes: acquiring, from the audio signal played by the device, reverberation times at different moments, and taking the acquired reverberation times as the reverberation parameters.

A reverberation time may be calculated in at least one of the following ways:

Way 1 when the device starts a corresponding audio play function according to a user instruction to play related audio content, the acoustic transfer function of the sound in a room is calculated in real time, and reverberation times (e.g. T60, T30, T20 and so on) needed at different moments are obtained according to the acoustic transfer function.

In this way, reverberation times needed at different moments are calculated in real time to obtain a more accurate reverberation time while a voice interaction is conducted between the user and the device.

Way 2

An audio test tone is played in the device to acquire estimated reverberation times needed at different daily moments within a specific period in the room environment where the device is located, and a plurality of estimated reverberation times needed at each moment are statistically analyzed to obtain the reverberation time needed at the moment, herein the specific period may be a week, a month or the like.

In this way, the change occurring in the reverberation time in the actual use of the device is estimated based on the historical data used by the device, thus, the device, when in practical use, is freed from calculating the reverberation times needed at different moments, and the data calculation workload and the power consumption of the device are consequentially reduced.

Further, de-reverberation is carried out in S101 in consideration of the features of the user as well as the features of the device, in this case, the embodiment further includes: calculating a reverberation parameter using an audio signal played by the device and a voice signal of the user collected by the microphone. Exemplarily, after collecting the voice of the user, the microphone in the device calculates the Direct-Reverberant Ratio (DRR) or the articulation index (C50, C80) of the voice of the user collected at each moment and takes the calculated DRRs or articulation indexes as the reverberation parameters.

Another embodiment of the disclosure lays emphasis on describing the specific implementation of a de-reverberation processing through a dynamic adjustment, and the other aspects of the another embodiment can be understood with reference to other embodiments of the disclosure and are therefore not described here repeatedly.

The following processing logic is used for a de-reverberation processing and a reverberation parameter in the embodiment:

when the reverberation level indicated by a reverberation parameter at the current moment is higher than a first control threshold, a parameter adopted by a multi-microphone array in the device for beam forming is adjusted according to the correspondence, in such a manner that the beam width of the acoustic wave generated by the multi-microphone array is smaller than a first width threshold, that is, the beam width is narrow when the reverberation is severe;

when the reverberation level indicated by a reverberation parameter at the current moment is lower than a second control threshold, the parameter adopted by the multi-microphone array in the device for beam forming is adjusted according to the correspondence, in such a manner that the beam width of the acoustic wave generated by the multi-microphone array is greater than a second width threshold, that is, the beam width is relatively wide when the reverberation is relatively weak; and when the reverberation level indicated by a reverberation parameter at the current moment is higher than the second control threshold value but lower than the first control threshold, the parameter adopted by the multi-microphone array in the device for beam forming is adjusted according to the correspondence, in such a manner that the beam width of the acoustic wave generated by the multi-microphone array is greater than the first width threshold but smaller than the second width threshold, that is, the beam width is mediate when the reverberation is mediate.

A single-channel de-reverberation mode is also adopted in the embodiment based on the foregoing beam forming-based de-reverberation mode so as to perform a single-channel de-reverberation operation on a parameter-adjusted output signal to further improve the effect of de-reverberation, the single-channel de-reverberation operation specifically includes: acquiring the reverberation level of an output signal, wherein if the reverberation level of an output signal is higher than that of another output signal, then the single-channel de-reverberation level of the output signal is higher than that of the another output signal.

when performing a single-channel de-reverberation on an output signal, to improve accuracy, a value representing the reverberation level of the output signal may be recalculated, for example, the reverberation level of an output signal subjected to a beam forming processing is calculated according to a reverberation parameter corresponding to the signal before the implementation of the beam forming processing and a parameter for beam forming.

Alternatively, to reduce the amount of calculation, the reverberation level of an output signal can be obtained based on an acquired acoustic beam width. If the beam width of an output signal is narrower than that of another output signal, then the single-channel de-reverberation level of the output signal is higher than that of the another output signal. For example, the beam width of an output signal subjected to a beam forming processing is L1 at a moment t1, and that of an output signal subjected to a beam forming processing is L2 at a moment t2, if L1 is smaller than L2, then the level of a single-channel de-reverberation performed on an output signal at the moment t1 is higher than that of a single-channel de-reverberation performed on an output signal at the moment t2.

The preset correspondences between reverberation levels and de-reverberation modes can be known from the foregoing operation.

For a device equipped with a multi-microphone array, the processing logic adopted in the embodiment is as follows: beam width is relatively wide when reverberation is weakest; beam width is relatively narrow when reverberation is mediate; when reverberation is relatively strong, beam width is relatively narrow, and a low-level single-channel de-reverberation is carried out; and when reverberation is very strong, beam width is relatively narrow and a high-level single-channel de-reverberation is carried out.

For a device equipped with a single microphone, a de-reverberation parameter used in an audio enhancement mode used by the single microphone in the device is adjusted in such a manner that the level of the de-reverberation realized using the de-reverberation parameter used in the audio enhancement mode at a moment is higher than that of the de-reverberation realized using the de-reverberation parameter used in the audio enhancement mode at another moment in a case where the level of the reverberation occurring in the room environment where the device is located at the moment is higher than that of the reverberation occurring in the room environment where the device is located at the another moment. That is, the higher the level of the reverberation of the room, the higher the level of the de-reverberation realized by the audio enhancement mode.

A de-reverberation control apparatus 200 for a device equipped with a microphone is provided in another embodiment of the disclosure. The apparatus 200 includes:

a reverberation parameter acquisition unit 201 arranged to acquire, from an audio signal played by the device, reverberation parameters which indicate, at different moments, reverberation levels of the room environment where the device is located; and a dynamic adjustment unit 202 arranged to dynamically adjust the de-reverberation mode adopted by the device according to the reverberation levels indicated by the reverberation parameters at different moments and preset correspondences between reverberation levels and de-reverberation modes.

Further, if the reverberation parameter acquisition unit 201 selects reverberation time as the reverberation parameter, then the reverberation parameter acquisition unit 201 is arranged to calculate, when the device starts a corresponding audio play function according to a user instruction to play related audio content, the acoustic transfer function of the sound in the room in real time, and obtain the reverberation times needed at different moments according to the acoustic transfer function, or arranged to play an audio test tone in the device to acquire estimated reverberation times needed at different daily moments within a specific period in the room environment where the device is located, and statistically analyze a plurality of estimated reverberation times needed at each moment to obtain the reverberation time needed at the moment.

The reverberation parameter acquisition unit 201 is arranged to calculate the reverberation parameter using an audio signal played by the device and a voice signal of the user collected by the microphone, in this case, the reverberation parameter selected by the reverberation parameter acquisition unit 201 includes the direct-reverberant ratio or the articulation index of the voice of the user at each moment.

Further, for a device equipped with a microphone array, the dynamic adjustment unit 202 is arranged to adjust, when the reverberation level indicated by a reverberation parameter at the current moment is greater than a first control threshold, a parameter adopted by the multi-microphone array in the device for beam forming according to the correspondence in such a manner that the beam width of the acoustic wave generated by the multi-microphone array is smaller than a first width threshold, adjust, when the reverberation level indicated by a reverberation parameter at the current moment is lower than a second control threshold, the parameter adopted by the multi-microphone array in the device for beam forming according to the correspondence in such a manner that the beam width of the acoustic wave generated by the multi-microphone array is greater than a second width threshold, and adjust, when the reverberation level indicated by a reverberation parameter at the current moment is greater than the second control threshold but smaller than the first control threshold, the parameter adopted by the multi-microphone array in the device for beam forming according to the correspondence in such a manner that the beam width of the acoustic wave generated by the multi-microphone array is greater than the first width threshold but smaller than the second width threshold. Based on this, the dynamic adjustment unit 202 is also arranged to perform a single-channel de-reverberation operation on a parameter-adjusted output signal, wherein if the beam width of an output signal is greater than that of another output signal, then the single-channel de-reverberation level of the output signal is higher than that of the another output signal, Further, the dynamic adjustment unit 202 is also arranged to perform a single-channel de-reverberation operation on a parameter-adjusted output signal, wherein the reverberation level of an output signal is acquired, and if the reverberation level of an output signal is higher than that of another output signal, then the single-channel de-reverberation level of the output signal is higher than that of the another output signal.

For a device equipped with a single microphone, the dynamic adjustment unit 202 adjusts a de-reverberation parameter used in an audio enhancement mode used by the single microphone in the device in such a manner that the level of the de-reverberation realized using the de-reverberation parameter at a moment is higher than that of the de-reverberation realized using the de-reverberation parameter at another moment in a case where the level of the reverberation occurring at the moment is higher than that of the reverberation occurring at the another moment.

The specific working of each component involved in embodiments of the apparatus disclosed herein can be understood with reference to related description given in embodiments of the method disclosed herein and is therefore not described here repeatedly.

According to the technical schemes provided herein, by continuously detecting and calculating reverberation parameters at different moments, the change occurring in the level of reverberation during a voice interaction process can be acquired in real time, and a de-reverberation mode can be dynamically adjusted according to the change in the level of reverberation, thus guaranteeing the adoption of a proper de-reverberation mode suitable for the current situation at any moment, avoiding the occurrence of much residual reverberation in some cases and a damage to the voice of the user in other cases, and consequentially improving the rate of the recognition of a device for the voice of the user.

Those ordinary skilled in the art can understand that all or a part of steps of the above embodiments can be performed by using a computer program flow. The computer program can be stored in a computer readable storage medium. The computer program, when executed on corresponding hardware platforms (such as system, installation, equipment and device) performs one of or a combination of the steps in the method.

Optionally, all or a part of steps of the above embodiments can also be performed by using an integrated circuit. These steps may be respectively made into integrated circuit modules. Alternatively, multiple modules or steps may be made into a single integrated circuit module.

The devices/function modules/function units in the above embodiment can be realized by using a general computing device. The devices/function modules/function units can be either integrated on a single computing device, or distributed on a network composed of multiple computing devices.

When the devices/function modules/function units in the above embodiment are realized in form of software function module and sold or used as an independent product, they can be stored in a computer-readable storage medium. The computer-readable storage medium may be an ROM, a magnetic disk or a compact disk.

The above is merely preferred embodiments of the disclosure but is not to be construed as limiting the scope of the disclosure. Any modification, equivalent substitute and improvement that can be devised by those of ordinary skill in the art without departing from the spirit of the disclosure shall fall within the protection scope of the disclosure.

The invention claimed is:

1. A de-reverberation control method for a device equipped with a microphone, comprising:
acquiring, from an audio signal played by the device, reverberation parameters which indicate, at respective moments, reverberation levels of a room environment where the device is located; and dynamically adjusting a de-reverberation mode adopted by the device according to the reverberation levels indicated by the reverberation parameters at respective moments and preset correspondences between reverberation levels and de-reverberation modes, wherein the reverberation parameters comprises at least one of reverberation time, direct-reverberant ratio or articulation index, and wherein dynamically adjusting the de-reverberation mode adopted by the device according to the reverberation levels indicated by the reverberation parameters at respective moments and the preset correspondences between reverberation levels and de-reverberation modes comprises:

when a reverberation level indicated by a reverberation parameter at a current moment is higher than a first control threshold, adjusting, according to the correspondences, a parameter adopted by a multi-microphone array in the device for beam forming in such a manner that an acoustic beam width generated by the multi-microphone array is smaller than a first width threshold;

when the reverberation level indicated by the reverberation parameter at the current moment is lower than a second control threshold, adjusting, according to the correspondences, the parameter adopted by the multi-microphone array in the device for beam forming in such a manner that the acoustic beam width generated by the multi-microphone array is greater than a second width threshold; and when the reverberation level indicated by the reverberation parameter at the current moment is higher than the second control threshold value but lower than the first control threshold, adjusting, according to the correspondences, the parameter adopted by the multi-microphone array in the device for beam forming in such a manner that the acoustic beam width generated by the multi-microphone array is greater than the first width threshold but smaller than the second width threshold.

2. The method according to claim 1, wherein acquiring, from the audio signal played by the device, the reverberation parameters which indicate, at respective moments, the reverberation levels of the room environment where the device is located comprises:

acquiring, from the audio signal played by the device, reverberation times at respective moments, and taking the acquired reverberation times as the reverberation parameters.

3. The method according to claim 2, wherein acquiring the reverberation times at respective moments comprises:

when the device starts a corresponding audio play function according to a user instruction to play related audio content, calculating, in real time, an acoustic transfer function of sounds in the room, and obtaining the reverberation time at each moment according to the acoustic transfer function; or, playing an audio test tone on the device, acquiring estimated reverberation times at respective daily moments within a specific period in the room environment where the device is located, and statistically analyzing a plurality of estimated reverberation times at respective moments to obtain the reverberation time at each moment.

4. The method according to claim 1, wherein the reverberation parameters are calculated from the audio signal played by the device and a voice signal of the user collected by the microphone, and the reverberation parameters comprise a direct-reverberant ratio or an articulation index of the voice of the user at each moment.

5. The method according to claim 1, further comprising: after adjusting, according to the correspondences, the parameter adopted by the multi-microphone array in the device for beam forming, performing a single-channel de-reverberation operation on an output signal subjected to a beam forming processing using the adjusted parameter, wherein the reverberation level of the output signal is acquired, if the reverberation level of one output signal is higher than that of another output signal, a single-channel de-reverberation level of said one output signal is higher than that of said another output signal, wherein acquiring the reverberation level of the output signal comprises:

calculating the reverberation level of the output signal according to a reverberation parameter corresponding to the signal before the implementation of the beam forming processing and the adjusted parameter for beam forming; or obtaining the reverberation level of the output signal according to an acoustic beam width corresponding to the output signal.

6. The method according to claim 1, wherein dynamically adjusting the de-reverberation mode adopted by the device according to the reverberation levels indicated by the reverberation parameters at respective moments and the preset correspondences between reverberation levels and de-reverberation modes further comprises:

adjusting, for a device equipped with a single microphone, a de-reverberation parameter used in an audio enhancement mode used by the single microphone of the device in such a manner that the level of the de-reverberation realized using the de-reverberation parameter at a moment is higher than that of the de-reverberation realized using the de-reverberation parameter at another moment in a case where the level of the reverberation occurring at said moment is higher than that of the reverberation occurring at said another moment.

7. A de-reverberation control apparatus for a device equipped with a microphone, comprising a processor and a memory for storing a set of instructions executable for the processor, wherein when the instructions are executed by the processor, the processor is arranged to:

acquire, from an audio signal played by the device, reverberation parameters which indicate, at respective moments, reverberation levels of a room environment where the device is located; and dynamically adjust a de-reverberation mode adopted by the device according to the reverberation levels indicated by the reverberation parameters at respective moments and preset correspondences between reverberation levels and de-reverberation modes, wherein the reverberation parameters comprises at least one of reverberation time, direct-reverberant ratio or articulation index, and wherein in order to dynamically adjust the de-reverberation mode adopted by the device according to the reverberation levels indicated by the reverberation parameters at respective moments and the preset correspondences between reverberation levels and de-reverberation modes, the processor is arranged to:
when a reverberation level indicated by a reverberation parameter at a current moment is greater than a first control threshold, adjust, according to the correspondences, a parameter adopted by a multi-microphone array in the device for beam forming in such a manner that an acoustic beam width generated by the multi-microphone array is smaller than a first width threshold;
when the reverberation level indicated by the reverberation parameter at the current moment is lower than a second control threshold, adjust, according to the correspondences, the parameter adopted by the multi-microphone array in the device for beam forming in such a manner that the acoustic beam width generated by the multi-microphone array is greater than a second width threshold; and
when the reverberation level indicated by the reverberation parameter at the current moment is greater than the second control threshold but smaller than the first control threshold, adjust, according to the correspondences, the parameter adopted by the multi-microphone array in the device for beam forming in such a manner that the acoustic beam width generated by the multi-microphone array is greater than the first width threshold but smaller than the second width threshold.

8. The apparatus according to claim 7, wherein in order to acquire, from the audio signal played by the device, the reverberation parameters which indicate, at respective moments, the reverberation levels of the room environment where the device is located, the processor is arranged:
acquire, from the audio signal played by the device, reverberation times at respective moments, and take the acquired reverberation times as the reverberation parameters.

9. The apparatus according to claim 8, wherein in order to acquire the reverberation times at respective moments, the processor is arranged to:
when the device starts a corresponding audio play function according to a user instruction to play related audio content, calculating, in real time, an acoustic transfer function of sounds in the room, and obtain the reverberation time at each moment according to the acoustic transfer function; or,
play an audio test tone on the device, acquire estimated reverberation times at respective daily moments within a specific period in the room environment where the device is located, and statistically analyze a plurality of estimated reverberation times at respective moments to obtain the reverberation time at each moment.

10. The apparatus according to claim 7, wherein
the reverberation parameters are calculated from the audio signal played by the device and a voice signal of the user collected by the microphone, and the reverberation parameters comprises a direct-reverberant ratio or an articulation index of the voice of the user at each moment.

11. The apparatus according to claim 7, wherein the processor is further arranged to: after adjusting, according to the correspondences, the parameter adopted by the multi-microphone array in the device for beam forming,
perform a single-channel de-reverberation operation on an output signal subjected to a beam forming processing using the adjusted parameter, wherein the reverberation level of the output signal is acquired, if the reverberation level of one output signal is higher than that of another output signal, a single-channel de-reverberation level of said one output signal is higher than that of said another output signal,
wherein in order to acquire the reverberation level of the output signal, the processor is arranged to:
calculate the reverberation level of the output signal according to a reverberation parameter corresponding to the signal before the implementation of the beam forming processing and the adjusted parameter for beam forming; or
obtain the reverberation level of the output signal according to an acoustic beam width corresponding to the output signal.

12. The apparatus according to claim 7, wherein in order to dynamically adjust the de-reverberation mode adopted by the device according to the reverberation levels indicated by the reverberation parameters at respective moments and the preset correspondences between reverberation levels and de-reverberation modes, the processor is further arranged to:
adjust, for a device equipped with a single microphone, a de-reverberation parameter used in an audio enhancement mode used by the single microphone of the device in such a manner that the level of the de-reverberation realized using the de-reverberation parameter at a moment is higher than that of the de-reverberation realized using the de-reverberation parameter at another moment in a case where the level of the reverberation occurring at said moment is higher than that of the reverberation occurring at said another moment.

13. A non-transitory computer readable storage medium, in which a computer executable instruction is stored; the computer executable instruction being used for performing a de-reverberation control method for a device equipped with a microphone, the method comprising:
acquiring, from an audio signal played by the device, reverberation parameters which indicate, at respective moments, reverberation levels of a room environment where the device is located; and
dynamically adjusting a de-reverberation mode adopted by the device according to the reverberation levels indicated by the reverberation parameters at respective moments and preset correspondences between reverberation levels and de-reverberation modes,
wherein the reverberation parameters comprises at least one of reverberation time, direct-reverberant ratio or articulation index, and
wherein dynamically adjusting the de-reverberation mode adopted by the device according to the reverberation levels indicated by the reverberation parameters at respective moments and the reset correspondences between reverberation levels and de-reverberation modes compromises:
when a reverberation level indicated by a reverberation parameter at a current moment is higher than a first control threshold, adjusting, according to the correspondences, a parameter adopted by a multi-microphone array in the device for beam forming in such a manner that an acoustic beam width generated by the multi-microphone array is smaller than a first width threshold;
when the reverberation level indicated by the reverberation parameter at the current moment adopted by the multi-microphone array in the device for beam forming in such a manner that the acoustic beam width generated by the multi-microphone array is greater than a second width threshold; and when the reverberation level indicated by the reverberation parameter at the current moment is higher than the second control threshold value but lower than the first control threshold, adjusting according to the correspondences, the parameter adopted by the multi-microphone array in the device for beam forming in such a manner that the acoustic beam width generated by the multi-microphone array is greater than the first width threshold but smaller than the second width threshold.

14. The non-transitory computer readable storage medium according to claim 13, wherein acquiring, from the audio signal played by the device, the reverberation parameters which indicate, at respective moments, the reverberation levels of the room environment where the device is located comprises:
acquiring, from the audio signal played by the device, reverberation times at respective moments, and taking the acquired reverberation times as the reverberation parameters.

15. The non-transitory computer readable storage medium according to claim 14, wherein acquiring the reverberation times at respective moments comprises:
when the device starts a corresponding audio play function according to a user instruction to play related audio content, calculating, in real time, an acoustic transfer function of sounds in the room, and obtaining the reverberation time at each moment according to the acoustic transfer function; or,
playing an audio test tone on the device, acquiring estimated reverberation times at respective daily moments within a specific period in the room environment where the device is located, and statistically analyzing a plurality of estimated reverberation times at respective moments to obtain the reverberation time at each moment.

16. The non-transitory computer readable storage medium according to claim 13, wherein
the reverberation parameters are calculated from the audio signal played by the device and a voice signal of the user collected by the microphone, and the reverberation parameters comprise a direct-reverberant ratio or an articulation index of the voice of the user at each moment.

17. The non-transitory computer readable storage medium according to claim 13, further comprising: after adjusting, according to the correspondences, the parameter adopted by the multi-microphone array in the device for beam forming,
performing a single-channel de-reverberation operation on an output signal subjected to a beam forming processing using the adjusted parameter, wherein the reverberation level of the output signal is acquired, if the reverberation level of one output signal is higher than that of another output signal, a single-channel de-reverberation level of said one output signal is higher than that of said another output signal,
wherein acquiring the reverberation level of the output signal comprises:
calculating the reverberation level of the output signal according to a reverberation parameter corresponding to the signal before the implementation of the beam forming processing and the adjusted parameter for beam forming; or
obtaining the reverberation level of the output signal according to an acoustic beam width corresponding to the output signal.

18. The non-transitory computer readable storage medium according to claim 13, wherein dynamically adjusting the de-reverberation mode adopted by the device according to the reverberation levels indicated by the reverberation parameters at respective moments and the preset correspondences between reverberation levels and de-reverberation modes further comprises:
adjusting, for a device equipped with a single microphone, a de-reverberation parameter used in an audio enhancement mode used by the single microphone of the device in such a manner that the level of the de-reverberation realized using the de-reverberation parameter at a moment is higher than that of the de-reverberation realized using the de-reverberation parameter at another moment in a case where the level of the reverberation occurring at said moment is higher than that of the reverberation occurring at said another moment.

* * * * *